(12) United States Patent
Evelich et al.

(10) Patent No.: US 11,993,419 B2
(45) Date of Patent: May 28, 2024

(54) PACKAGED FOOD PRODUCT AND METHOD OF PRODUCING THE PACKAGED FOOD PRODUCT

(71) Applicant: Blue Buffalo Enterprises, Inc., Wilton, CT (US)

(72) Inventors: Sean Evelich, Middletown, CT (US); Nicole Kandoth, Nyack, NY (US); James E. McCay, Fairfield, CT (US); Noel R. Pollen, Hopkins, MN (US); Trond Erik Tollefsen, London (GB)

(73) Assignee: Blue Buffalo Enterprises, Inc., Wilton, CT (US)

( * ) Notice: Subject to any disclaimer, the term of this patent is extended or adjusted under 35 U.S.C. 154(b) by 0 days.

(21) Appl. No.: 17/386,827

(22) Filed: Jul. 28, 2021

(65) Prior Publication Data

US 2021/0354878 A1    Nov. 18, 2021

Related U.S. Application Data

(62) Division of application No. 16/574,784, filed on Sep. 18, 2019, now Pat. No. 11,104,482.

(51) Int. Cl.
*B65D 21/08* (2006.01)
*A01K 5/00* (2006.01)
(Continued)

(52) U.S. Cl.
CPC .............. *B65D 21/086* (2013.01); *A01K 5/00* (2013.01); *A23K 50/48* (2016.05); *A23P 10/00* (2016.08);
(Continued)

(58) Field of Classification Search
CPC .......... B65D 21/086; B65D 1/32; B65D 1/34; B65D 77/2032; B65D 77/245;
(Continued)

(56) References Cited

U.S. PATENT DOCUMENTS

| 159,545 A | 2/1875 | Hagerty |
| 339,527 A | 4/1886 | Calef |

(Continued)

FOREIGN PATENT DOCUMENTS

| CN | 201033681 | 3/2008 |
| FR | 2670188 | 6/1992 |

(Continued)

*Primary Examiner* — Drew E Becker
(74) *Attorney, Agent, or Firm* — Diederiks & Whitelaw, PLC; Annette M. Frawley, Esq.

(57) ABSTRACT

A packaged food product includes a container and a food product. The container has a rim and at least one wall extending away from the rim. The at least one wall defines a storage area, and the food product is retained within the storage area such that the food product is in contact with the at least one wall. The at least one wall is readily deformable by a hand of a user to reduce a volume of the storage area. Reducing the volume of the storage area causes the food product to exit the storage area. The container includes an integral tool portion including a tine extending from a distal end of the tool portion for breaking up the food product after removal from the storage area. The food product can be a wet cat or dog food.

16 Claims, 4 Drawing Sheets

(51) Int. Cl.
| | |
|---|---|
| *A23K 50/48* | (2016.01) |
| *A23P 10/00* | (2016.01) |
| *A47G 21/02* | (2006.01) |
| *A47J 43/28* | (2006.01) |
| *B65D 1/32* | (2006.01) |
| *B65D 1/34* | (2006.01) |
| *B65D 77/20* | (2006.01) |
| *B65D 77/24* | (2006.01) |
| *B65D 81/36* | (2006.01) |
| *B65D 83/00* | (2006.01) |
| *B65D 85/72* | (2006.01) |

(52) U.S. Cl.
CPC .............. *A47G 21/02* (2013.01); *A47J 43/28* (2013.01); *A47J 43/288* (2013.01); *B65D 1/32* (2013.01); *B65D 1/34* (2013.01); *B65D 77/2032* (2013.01); *B65D 77/245* (2013.01); *B65D 81/36* (2013.01); *B65D 83/0094* (2013.01); *B65D 85/72* (2013.01); *B32B 2439/70* (2013.01)

(58) Field of Classification Search
CPC .... B65D 81/36; B65D 83/0094; B65D 85/72; B65D 2575/3245; B65D 2575/54; B65D 1/40; B65D 75/326; B65D 77/2024; B65D 75/36; B65D 75/32; B65D 75/325; B65D 75/366; B65D 1/30; B65D 77/00; B65D 77/20; B65D 1/26; B65D 83/00; A01K 5/00; A23K 50/48; A23P 10/00; A47G 21/02; A47J 43/00; A47J 43/28; A47J 43/288; B32B 2439/70
USPC ...................... D9/425; 426/115, 111
See application file for complete search history.

(56) References Cited

U.S. PATENT DOCUMENTS

| | | | | |
|---|---|---|---|---|
| 354,679 | A * | 12/1886 | Borchers | |
| 1,485,535 | A * | 3/1924 | Stein | A47J 43/288 7/113 |
| 1,781,837 | A * | 11/1930 | Funk | A47J 43/288 294/32 |
| 2,135,242 | A * | 11/1938 | Smith | B65D 81/36 220/319 |
| 2,584,379 | A * | 2/1952 | Chmielewski | B65D 77/245 206/541 |
| 2,747,911 | A * | 5/1956 | Kuever | A47J 43/288 294/7 |
| 2,873,421 | A | 2/1959 | Mierendorf et al. | |
| 3,020,077 | A | 2/1962 | Rokos | |
| 3,116,152 | A * | 12/1963 | Smith | B65D 35/08 426/115 |
| 3,360,121 | A | 12/1967 | Zoeller et al. | |
| 3,618,751 | A | 11/1971 | Rich | |
| 4,203,516 | A * | 5/1980 | Stonoga | B65D 85/00 426/112 |
| 4,218,010 | A | 8/1980 | Ruff | |
| 4,341,302 | A * | 7/1982 | Baker | B65D 75/326 206/568 |
| 4,394,906 | A * | 7/1983 | Hollenbeck | B65D 1/26 220/4.23 |
| 4,880,112 | A * | 11/1989 | Conrad | B65D 77/20 220/DIG. 13 |
| 4,896,423 | A | 1/1990 | Kinsey | |
| D307,716 | S * | 5/1990 | Fitzloff | D9/425 |
| 5,114,374 | A * | 5/1992 | Estiva | A61J 9/00 215/11.1 |
| D328,565 | S | 8/1992 | Lawless et al. | |
| 5,203,459 | A | 4/1993 | Wade | |
| 5,425,475 | A | 6/1995 | Clark | |
| 5,511,684 | A * | 4/1996 | Weaver, Jr. | B65D 25/20 206/505 |
| 5,695,086 | A * | 12/1997 | Viola | B65D 43/0212 220/376 |
| D422,502 | S * | 4/2000 | Keller | D9/451 |
| 6,145,204 | A | 11/2000 | Cash | |
| 6,688,469 | B1 * | 2/2004 | Barnes | B65D 77/245 206/217 |
| D529,396 | S * | 10/2006 | Whipple | D9/425 |
| 7,644,832 | B1 * | 1/2010 | Tsengas | B65D 51/246 220/796 |
| D620,809 | S | 8/2010 | Caldwell et al. | |
| D623,074 | S | 9/2010 | Caldwell et al. | |
| D632,564 | S | 2/2011 | Caldwell et al. | |
| D632,567 | S | 2/2011 | Caldwell et al. | |
| D632,568 | S | 2/2011 | Caldwell et al. | |
| D634,643 | S | 3/2011 | Caldwell et al. | |
| D643,310 | S * | 8/2011 | Birchmeier | D9/425 |
| D660,718 | S | 5/2012 | McDermott et al. | |
| 8,529,974 | B2 | 9/2013 | Ortiz et al. | |
| D803,697 | S * | 11/2017 | Planer | D9/611 |
| 10,124,923 | B1 | 11/2018 | Soehnlen et al. | |
| 11,104,482 | B2 * | 8/2021 | Evelich | B65D 21/086 |
| D992,414 | S * | 7/2023 | Budd | D9/425 |
| D994,481 | S * | 8/2023 | Budd | D9/425 |
| 2001/0045374 | A1 * | 11/2001 | Selker | A61J 7/0023 206/229 |
| 2003/0015144 | A1 * | 1/2003 | Bennett | B65D 83/0005 119/61.5 |
| 2003/0178339 | A1 * | 9/2003 | De Marco | B65D 1/30 206/820 |
| 2004/0074905 | A1 * | 4/2004 | Haggard | B65D 51/24 220/212 |
| 2004/0134438 | A1 * | 7/2004 | Ticktin | A01K 5/0114 119/65 |
| 2005/0042338 | A1 | 2/2005 | Tucker et al. | |
| 2006/0144340 | A1 * | 7/2006 | Burge | A01K 5/0121 119/61.5 |
| 2007/0071852 | A1 * | 3/2007 | Krueger | A23L 13/06 426/106 |
| 2008/0112750 | A1 * | 5/2008 | Thomson | B65D 77/245 401/130 |
| 2008/0217333 | A1 * | 9/2008 | Mayo | B65D 51/32 220/212 |
| 2009/0041910 | A1 * | 2/2009 | Rabinovitch | A01K 5/0128 119/61.5 |
| 2009/0045230 | A1 * | 2/2009 | Liberatore | B65D 85/72 222/566 |
| 2009/0047394 | A1 | 2/2009 | Willcocks et al. | |
| 2009/0114708 | A1 * | 5/2009 | Sung | B65D 51/246 229/120 |
| 2009/0202684 | A1 * | 8/2009 | Willemsen | B65D 1/32 220/666 |
| 2009/0294454 | A1 * | 12/2009 | Harding | B65D 77/245 220/523 |
| 2009/0297248 | A1 * | 12/2009 | Martin, Jr. | B26B 3/00 401/143 |
| 2011/0200729 | A1 * | 8/2011 | Caswell | A47J 43/288 99/537 |
| 2013/0236861 | A1 | 9/2013 | Wilmers et al. | |
| 2014/0099409 | A1 | 4/2014 | Cassens et al. | |
| 2014/0270895 | A1 * | 9/2014 | Andersen | B65D 83/00 401/118 |
| 2015/0008230 | A1 * | 1/2015 | Saito | A47G 19/02 220/574 |
| 2016/0001967 | A1 * | 1/2016 | Franzén | B65D 35/28 426/115 |
| 2016/0152406 | A1 * | 6/2016 | Lloyd | B65D 75/58 53/467 |
| 2017/0225823 | A1 * | 8/2017 | Forward | B65D 5/5273 |
| 2017/0334619 | A1 * | 11/2017 | Desloge | B65D 85/70 |
| 2018/0141735 | A1 * | 5/2018 | Yoshiga | B65B 3/04 |
| 2019/0313858 | A1 * | 10/2019 | Stella | A47J 43/28 |
| 2019/0365126 | A1 * | 12/2019 | Carter | A47G 21/023 |
| 2020/0239196 | A1 * | 7/2020 | Taylor | B65D 83/0005 |
| 2020/0239221 | A1 * | 7/2020 | VanMeter | B65D 75/525 |

(56) References Cited

U.S. PATENT DOCUMENTS

| | | | |
|---|---|---|---|
| 2021/0347066 A1* | 11/2021 | Swilley | A47J 43/18 |
| 2022/0202046 A1* | 6/2022 | Budd | B65D 77/2024 |
| 2022/0369591 A1* | 11/2022 | Nobata | B65D 77/2024 |

FOREIGN PATENT DOCUMENTS

| | | | |
|---|---|---|---|
| JP | H09323781 | 12/1997 | |
| JP | 2009001306 | 1/2009 | |
| KR | 100973440 | 8/2010 | |
| NL | 1021615 | 4/2004 | |
| WO | WO-9925205 A1 * | 5/1999 | A01K 15/025 |
| WO | WO 2006/137674 | 12/2006 | |
| WO | WO 2009/011571 | 1/2009 | |
| WO | WO 2013/079069 | 6/2013 | |
| WO | WO 2015/019352 | 2/2015 | |
| WO | WO 2015/156665 | 10/2015 | |

\* cited by examiner

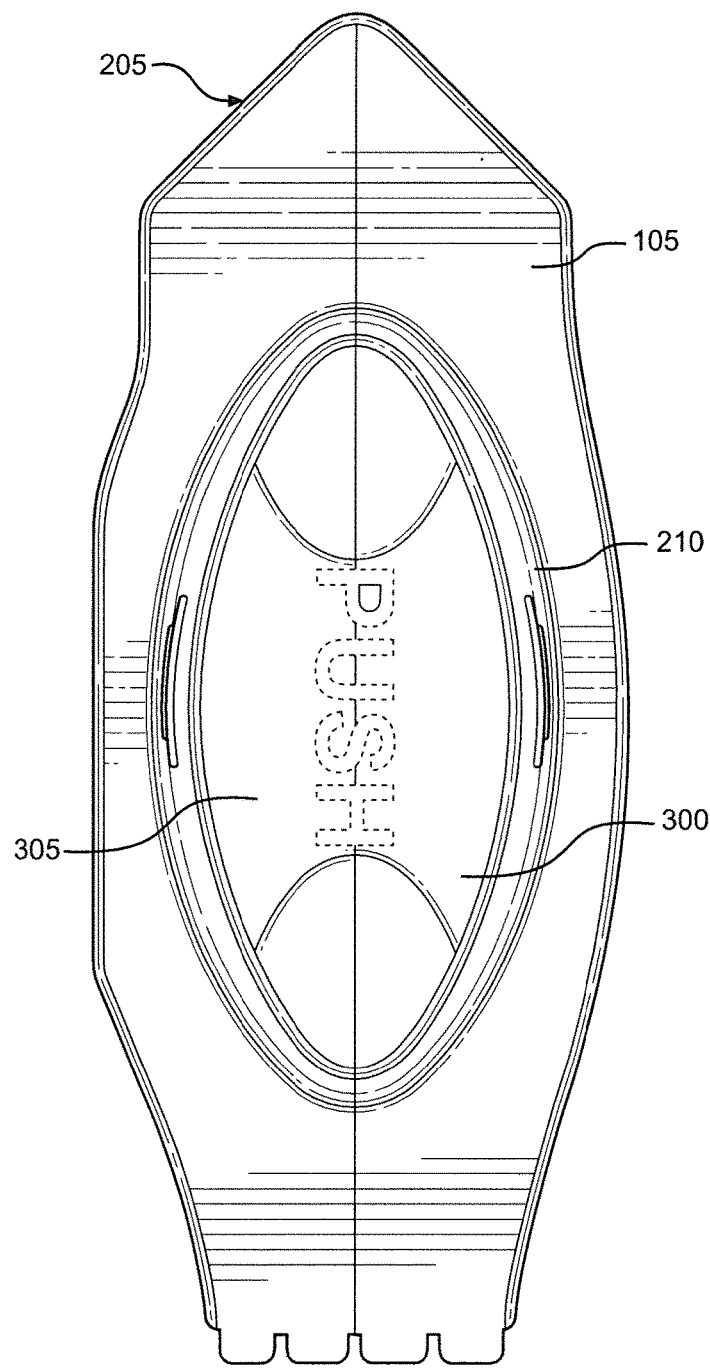 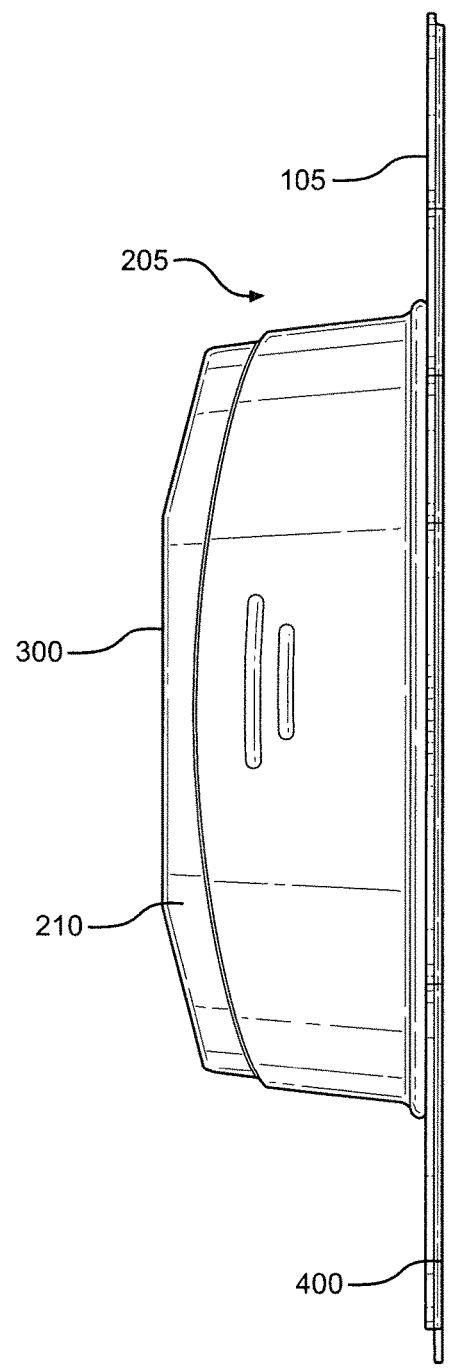
FIG. 3                    FIG. 4

PACKAGED FOOD PRODUCT AND METHOD OF PRODUCING THE PACKAGED FOOD PRODUCT

CROSS-REFERENCE TO RELATED APPLICATIONS

This application represents a divisional application of U.S. patent application Ser. No. 16/574,784 entitled "Packaged Food Product and Method of Producing the Packaged Food Product" filed Sep. 18, 2019, pending. The entire content of this application is incorporated herein by reference.

BACKGROUND OF THE INVENTION

The present invention pertains to the art of food production and, more particularly, to packaging for food products.

Food products are often packaged prior to sale. Such packaging can take the form of cans, jars, boxes or bags, for example. In the case of pet food, such as wet cat or dog food, cans are a common packaging type. When the wet food is served, consumers frequently remove the food from the can and place it into or onto a bowl, dish or plate, for example, where the food may then be broken up. This requires a spoon or fork, both for the serving and the chopping. However, many consumers would prefer not to use a utensil for this task that they themselves also eat with, necessitating the ownership of one or more dedicated pet food utensils. At the very least, this process results in additional dirty utensils that must be cleaned. Accordingly, it would desirable to provide a way for consumers to serve wet pet food without using a utensil.

In addition, one reason why a consumer might use a utensil to serve wet pet food from a can is that the can contains multiple servings and the consumer only wishes to serve part of the can's contents. Accordingly, it would also be desirable to provide wet pet food in single-serve packaging.

SUMMARY OF THE INVENTION

The present invention achieves the above goals through the use of packaging that is readily deformable by hand, with the deformation causing the contents of the packaging to exit the packaging. Preferably, the packaging is sized to provide a single serving. Additionally, the packaging includes structure to help break up the contents after they have been dispensed.

In particular, a packaged food product comprises a container and a food product. The container includes a rim and at least one wall extending away from the rim. The at least one wall defines a storage area. The food product is retained within the storage area and in contact with the at least one wall. The at least one wall is configured to be readily deformable by a hand of a user to reduce a volume of the storage area. The packaged food product is configured such that reducing the volume of the storage area causes the food product to exit the storage area. Also, a portion of the rim extends beyond the at least one wall, preferably by a predetermined distance of at least 1 centimeter, to establish an integral utensil or tool portion. The food product can take various forms, such as a wet cat food or a wet dog food. In a form of the invention, the tool portion of the rim includes at least one tine for breaking up the food after the food has been removed from the container but prior to serving.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 3 is a top view of a container of the packaged food product of FIG. 2, with the food product omitted.

FIG. 4 is a side view of the container.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art how to construct and employ the present invention.

As discussed above, pet food, such as wet cat or dog food, is commonly packaged in cans. To serve such pet food, a consumer would use a separate utensil to remove the pet food from the can and break it up. In some cases, only a portion of the pet food is removed from the can. This process necessitates the cleaning of the utensil and, for some consumers, a dedicated pet food utensil. The present invention was developed to address this problem. Specifically, the present invention provides a container with a storage area for retaining a food product and at least one wall that is readily deformable by hand to reduce a volume of the storage area. Reducing the volume of the storage area causes the food product to exit the storage area. In other words, the user can squeeze the container to dispense the food, avoiding the need for a separate utensil. The container is sized to hold a single serving of the food product. Therefore, the user does not need to try to serve only a portion of the food product. In addition, part of the rim of the container extends beyond the at least one wall to establish an integrally formed utensil or tool portion, preferably including one or more tines. This structure can be used to break up the food product after it has been dispensed, again avoiding the need for a separate utensil.

Figure 1:
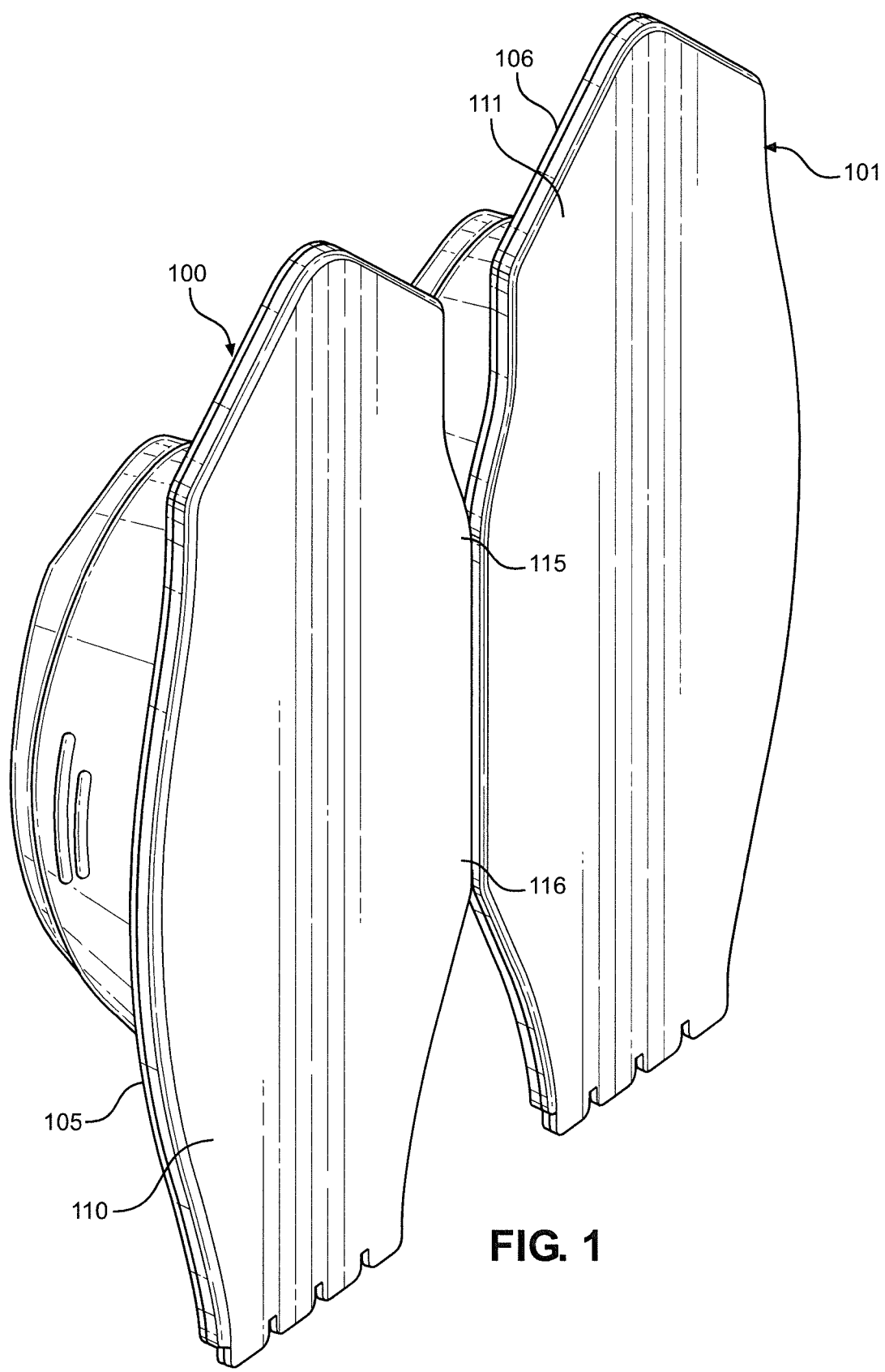
FIG. 1 is a perspective view of two packaged food products produced in accordance with the present invention.

With reference to FIG. 1, two packaged food products 100 and 101 are shown. Packaged food products 100 and 101 are attached to one another and can be sold as a unit. However, it should be recognized that packaged food products 100 and 101 can also be sold individually or in larger quantities (with additional packaged food products attached thereto).

Packaged food products 100 and 101 are functionally identical but their shapes are mirror images of one another, with the plane of symmetry being located at their point of attachment. In particular, packaged food product 100 has a rim 105 and a lid 110 in sealing contact with rim 105, while packaged food product 101 has a rim 106 and a lid 111 in sealing contact with rim 106. Rim 105 is attached to rim 106 to attach packaged food products 100 and 101 to one another. This connection is obscured by lids 110 and 111 but generally extends between points 115 and 116. Packaged food products 100 and 101 can be attached by molding a single substrate and then blow molding two containers from the substrate, for example. When desired, packaged food products 100 and 101 can be readily detached from each other through a bending operation about a connection line extending between points 115 and 116. Since packaged food product 101 is nearly identical to packaged food product 100, packaged food product 101 will not be discussed further.

Figure 2:
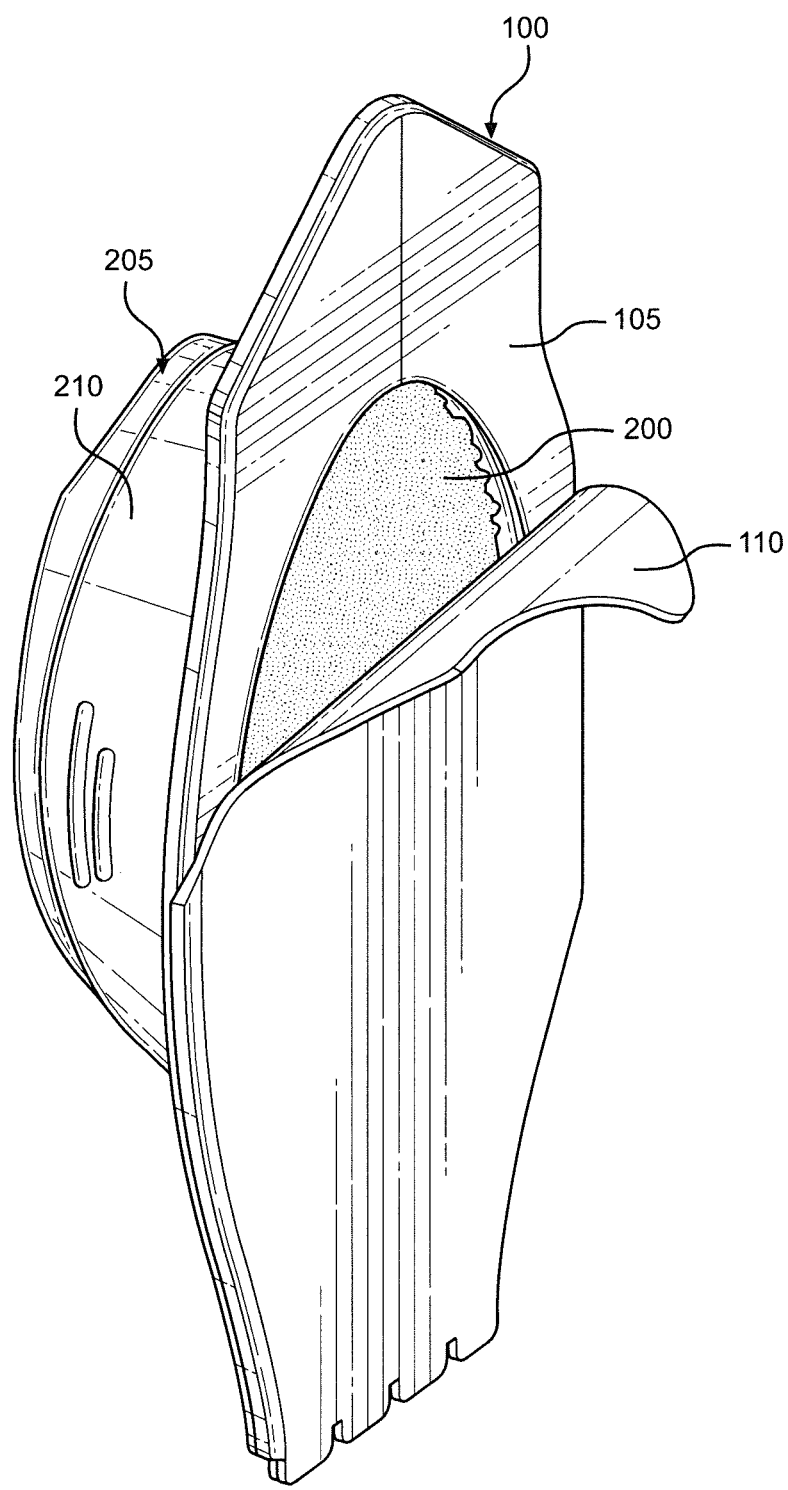
FIG. 2 is a perspective view of one of the packaged food products, with a lid partially peeled away to expose a food product.

Turning to FIG. 2, packaged food product 100 is shown by itself, with lid 110 peeled partially away from rim 105 to expose a food product 200. Food product 200 is a single serving of a wet pet food, e.g., wet cat food or wet dog food. However, food product 200 can take other forms in other embodiments. Rim 105 and lid 110 form part of a container 205, which is configured to retain food product 200. Container 205 further includes a sidewall 210 extending away from rim 105, with sidewall 210 being shown to an annular wall.

In FIG. 3, food product 200 is omitted so that a bottom wall 300 of container 205 can be seen. Sidewall 210 and bottom wall 300 together define a storage area 305 in which food product 200 is retained. As should be recognized based on FIGS. 2 and 3, food product 200 is in contact with bottom wall 300 during storage and is typically in contact with at least part of sidewall 210 as well. While one exemplary arrangement for sidewall 210 and bottom wall 300 has been illustrated, it should be understood that many different arrangements can be used in accordance with the present invention. In other words, the shape of storage area 305 can vary. For example, the single sidewall 210 can be replaced with multiple walls, or sidewall 210 and bottom wall 300 can be combined, with storage area 305 taking on a hemispherical shape. In general, container 205 should have at least one wall defining storage area 305.

Preferably, molding, and more preferably blow molding, is used to create sidewall 210, bottom wall 300 and storage area 305. In a preferred form, a flat plastic substrate in the shape of rim 105 (not shown) is subjected to blow molding to cause the center of the substrate to expand. The expansion is controlled in such a way that the center portion becomes sidewall 210 and bottom wall 300, thereby also forming storage area 305. As a result of this process, sidewall 210 and bottom wall 300 are magnitudes thinner than rim 105. In particular, by this construction, the thickness of sidewall 210 and bottom wall 300 is established so that at least one of sidewall 210 and bottom wall 300 is readily deformable. For purposes of the present invention, by "readily deformable" it is meant that a user can deform sidewall 210 or bottom wall 300 by hand (i.e., using one or both hands and without any tools) without requiring an above average amount of strength. This allows the user to push one or both of sidewall 210 and bottom wall 300 inward (i.e., readily collapsing the same into storage area 305) to reduce the volume of storage area 305. Reducing the volume of storage area 305 causes food product 200 to exit storage area 305. As a result, the user can dispense food product 200 without using a utensil.

While the discussion above focuses on the thickness of sidewall 210 and bottom wall 300, it should be recognized that the shapes of sidewall 210 and bottom wall 300 also have an effect on their deformability. Accordingly, this parameter is also adjusted to provide the desired degree of deformability. In general, at least one of the walls defining storage area 305 is configured to be readily deformable and has at least a slight taper from rim 105 as perhaps best shown in FIG. 4. To further enhance the collapsing operation, sidewall 210 is also preferably tiered (shown in FIG. 4 with two, upper and lower tiered sections but additional tiers could be provided).

Figure 5:
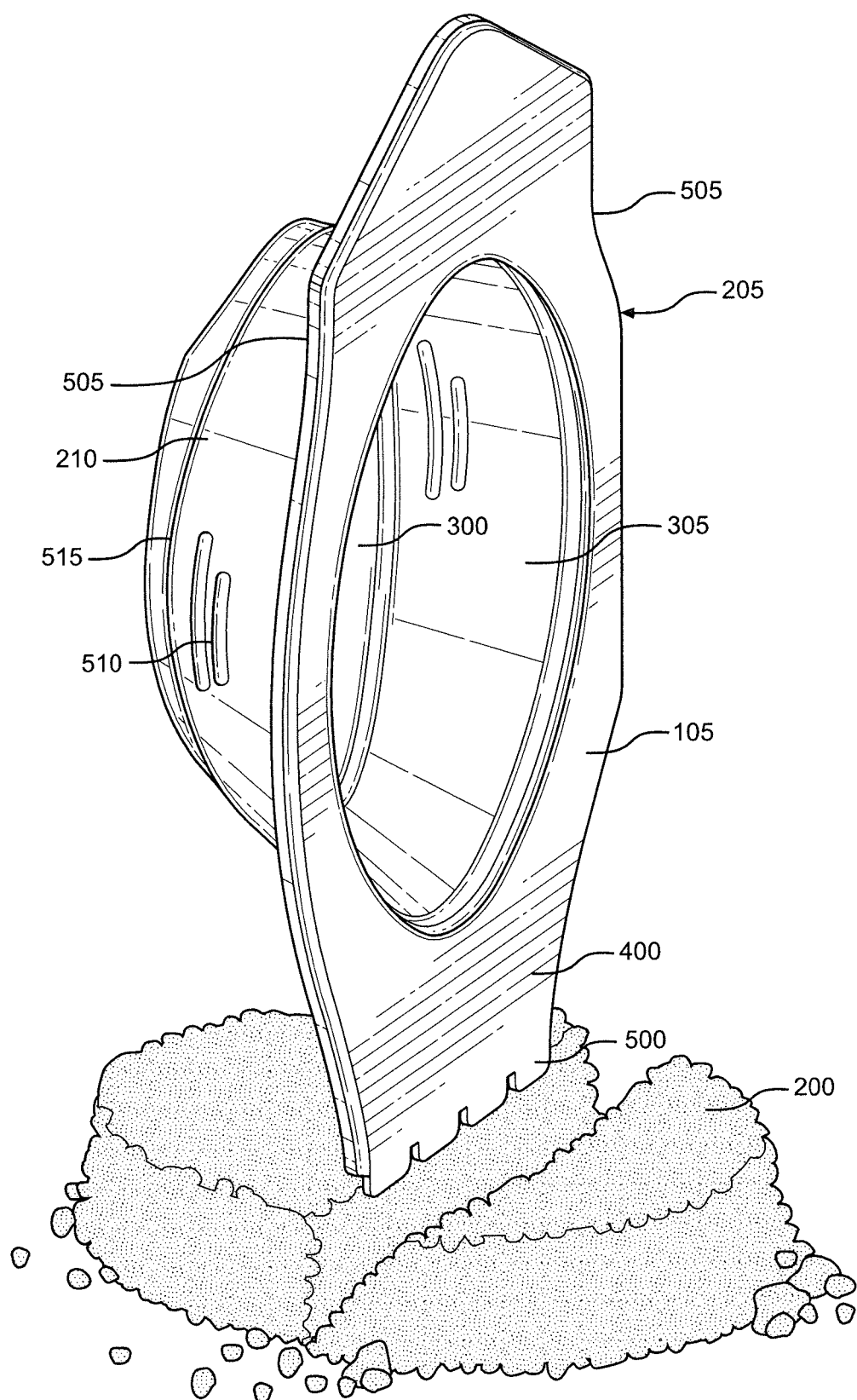
FIG. 5 is a perspective view of the container showing the container being used to break up the food product.

Turning further to FIG. 4, it can be seen that a portion 400 of rim 105 extends beyond sidewall 210. Preferably, portion 400 constitutes an integrally formed utensil or tool portion which extends beyond sidewall 210 by at least 1 centimeter. In some embodiments, such as the one illustrated, tool portion 400 extends beyond sidewall by 2 or more centimeters. In combination with the relative thinness of rim 105, this allows the user to use tool portion 400 like a blade, as shown in FIG. 5. In particular, the user can use tool portion 400 to chop or break up food product 200. To help accomplish this, tool portion 400 is preferably formed with a plurality of tines 500. Alternatively, tool portion 400 can have serrations (or even a straight or tapered edge). In addition, rim 105 has two opposing indents or recessed regions 505, which serve as grip portions to help the user grip container 205 during chopping. Similarly, sidewall 210 has protrusions 510, which serve as grip portions to help the user grip container 205 during dispensing of food product 200. A small step 515 near the bottom of sidewall 210 helps create lateral rigidity.

Based on the above, it should be readily apparent that the present invention provides a way for consumers to serve wet pet food without using a utensil. While certain preferred embodiments of the present invention have been set forth, it should be understood that various changes or modifications could be made without departing from the spirit of the present invention. In general, the invention is only intended to be limited by the scope of the following claims.

The invention claimed is:

1. A packaged food product comprising:
   a container, wherein the container includes:
      a rim;
      at least one wall extending away from the rim, wherein the at least one wall defines a storage area; and
      a tool portion integral with and fixed relative to the rim, and, as packaged, extending from the rim beyond and externally away from the at least one wall and including at least one tine extending from a distal end of the tool portion; and
   a food product, being a wet cat food or a wet dog food, retained within the storage area and in contact with the at least one wall, wherein the at least one wall is configured to be readily deformable by a hand of a user to reduce a volume of the storage area, and the packaged food product is configured such that reducing the volume of the storage area causes the food product to exit the storage area, with the at least one tine being configured for use in breaking up the food product after the food product is removed from the storage area.

2. The packaged food product of claim 1, wherein the at least one wall has a first thickness, the rim has a second thickness, and the second thickness is greater than the first thickness.

3. The packaged food product of claim 2, wherein the at least one wall constitutes a blow-molded wall which is integral with both the rim and the tool portion.

4. The packaged food product of claim 1, wherein the at least one wall includes a bottom wall and at least one sidewall, and the bottom wall and the at least one sidewall together define the storage area, with the at least one sidewall tapering inward from the rim.

5. The packaged food product of claim 4, wherein the at least one sidewall is tiered.

6. The packaged food product of claim 1, wherein the tool portion extends from the rim beyond the at least one wall by at least 1 centimeter.

7. The packaged food product of claim 6, wherein the tool portion of the rim extends beyond the at least one wall by at least 2 centimeters.

8. The packaged food product of claim 1, wherein the tool portion of the rim includes at least two spaced tines extending from the distal end.

9. The packaged food product of claim 1, wherein the container further includes a lid in contact with the rim, with the lid sealing the storage area.

10. The packaged food product of claim 1, wherein the container constitutes a first container, and the food product constitutes a first food product, the packaged food product further comprising a second container detachably connected to the first container and a second food product retained within the second container.

11. The packaged food product of claim 1, wherein the tine is at least partly defined by multiple straight edges.

12. The packaged food product of claim 11, wherein the tine is further at least partly defined by rounded corners connecting respective ones of the multiple straight edges.

13. The packaged food product of claim 1, wherein the rim includes a recessed region configured to be used for gripping the container while using the at least one tine for breaking up the food product after the food product is removed from the storage area.

14. The packaged food product of claim 4, wherein the at least one sidewall includes a protrusion configured to be used for gripping the container during dispensing of the food product.

15. The packaged food product of claim 9, wherein the lid is further in direct contact with the tool portion.

16. The packaged food product of claim 8, wherein each of the at least two spaced tines extending from the distal end is at least partly defined by two substantially parallel edges.

* * * * *